(12) United States Patent
Min et al.

(10) Patent No.: US 11,981,055 B2
(45) Date of Patent: May 14, 2024

(54) INJECTION MOLD, INJECTION MOLDING MACHINE INCLUDING INJECTION MOLD, AND METHOD FOR MANUFACTURING INJECTION-MOLDED PRODUCT USING INJECTION MOLDING MACHINE

(71) Applicant: LG CHEM, LTD., Seoul (KR)

(72) Inventors: Inki Min, Daejeon (KR); Dongchul Shim, Daejeon (KR); Cheol Hwan Hwang, Daejeon (KR); Minchul Lee, Daejeon (KR); In Woo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/256,569

(22) PCT Filed: Dec. 4, 2019

(86) PCT No.: PCT/KR2019/016989
§ 371 (c)(1),
(2) Date: Dec. 28, 2020

(87) PCT Pub. No.: WO2020/130426
PCT Pub. Date: Jun. 25, 2020

(65) Prior Publication Data
US 2021/0268694 A1    Sep. 2, 2021

(30) Foreign Application Priority Data

Dec. 17, 2018  (KR) ........................ 10-2018-0163101
Nov. 28, 2019  (KR) ........................ 10-2019-0154973

(51) Int. Cl.
B29C 45/26    (2006.01)
B29C 33/56    (2006.01)
(Continued)

(52) U.S. Cl.
CPC ............ *B29C 33/56* (2013.01); *B29C 44/421* (2013.01); *B29C 45/26* (2013.01);
(Continued)

(58) Field of Classification Search
CPC ..... B29C 44/42; B29C 45/26; B29K 2827/14; B29K 2827/16; B29K 2827/18; B29K 2871/00
(Continued)

(56) References Cited

U.S. PATENT DOCUMENTS

2004/0156945 A1 *   8/2004   Yoon .................. B29C 44/0461
                                                                425/575
2006/0228434 A1    10/2006   Freser-Wolzenburg
(Continued)

FOREIGN PATENT DOCUMENTS

JP          6-238762 A    8/1994
JP          07-117084 A   5/1995
(Continued)

OTHER PUBLICATIONS

English abstract of JP2013095043A (Year: 2013).*
(Continued)

*Primary Examiner* — Jeffrey M Wollschlager
*Assistant Examiner* — Xue H Liu
(74) *Attorney, Agent, or Firm* — BRYAN CAVE LEIGHTON PAISNER LLP

(57) ABSTRACT

The present invention relates to an injection mold, an injection molding machine including the injection mold, and a method of manufacturing an injection-molded product using the injection molding machine. More specifically, the present invention relates to an injection mold including a mold having a mold surface on which one or more deposition layers are formed, wherein the deposition layer includes a fluororesin homopolymer or polyether ether ketone (Continued)

(PEEK); an injection molding machine including the injection mold; and a method of manufacturing an injection-molded product using the injection molding machine.

8 Claims, 11 Drawing Sheets

(51) Int. Cl.
*B29C 44/42* (2006.01)
*B29K 105/04* (2006.01)

(52) U.S. Cl.
CPC .... *B29K 2105/041* (2013.01); *B29K 2827/14* (2013.01); *B29K 2827/16* (2013.01); *B29K 2827/18* (2013.01); *B29K 2871/00* (2013.01)

(58) Field of Classification Search
USPC ........................................................ 264/338
See application file for complete search history.

(56) References Cited

U.S. PATENT DOCUMENTS

| 2011/0136985 A1* | 6/2011 | Moon ................... B29C 33/64 264/338 |
|---|---|---|
| 2015/0097104 A1 | 4/2015 | Noblat et al. |
| 2018/0155569 A1* | 6/2018 | Pham ................... C09D 5/031 |

FOREIGN PATENT DOCUMENTS

| JP | H0899376 A | 4/1996 |
|---|---|---|
| JP | 08-238629 A | 9/1996 |
| JP | 2002321246 A | 11/2002 |
| JP | 2007-118232 A | 5/2007 |
| JP | 2007118232 A | 5/2007 |
| JP | 4642631 B2 | 3/2011 |
| JP | 2013-095043 A | 5/2013 |
| JP | 2013095043 A | 5/2013 |
| KR | 93-17918 U | 8/1993 |
| KR | 10-2003-0070706 A | 9/2003 |
| KR | 10-2004-0080211 A | 9/2004 |
| KR | 10-0483972 B1 | 4/2005 |
| KR | 10-2006-0087845 A | 8/2006 |
| KR | 10-1512908 B1 | 4/2015 |
| KR | 10-1867355 B1 | 6/2018 |

OTHER PUBLICATIONS

"Vicote coatings enable Du Wei's new EVA shoe mold tools to significantly outperform traditional molds," Anti-Corrosion: Methods and Materials, vol. 56, No. 5, 11, Sep. 2009, (3 Pages) XP 55837726.

"High Temperature Performance Coatings for Strength and Durability" Mar. 1, 2017, The Next Generation of Coatings, Victrex, (16 Pages) XP 55585021.

Emerald insight, Emerald Group Publishing Limited, vol. 56,No. 5, Sep. 11, 2009, Vicote coatings enable Du Wei s new EVA shoe mold tools to significantly outperform traditional molds (3 Pages).

Sanchez-Urbano, Francisco et al., "Non-Stick Coatings in Aluminium Molds for the Production of Polyurethane Foam", Coatings, vol. 8, No. 9, Aug. 27, 2018 (Aug. 27, 2018), pp. 1-14, XP093141213, CH, ISSN: 2079-6412, DOI: 10.3390/coatings8090301.

Akinci, Akin et al., "Coating of Al mould surfaces with polytetrafluoroethylene (PTFE), fluorinated ethylene propylene (FEP), perfluoroalkoxy (PFA) and ethylene-tetrafluoroethylene (ETFE)", e-Polymers, vol. 9, No. 1, Dec. 1, 2009 (Dec. 1, 2009), pp. 1-7, XP093141214, DE ISSN: 2197-4586, DOI: 10.1515/epoly.2009.9. 1.401.

* cited by examiner

[FIG. 1]
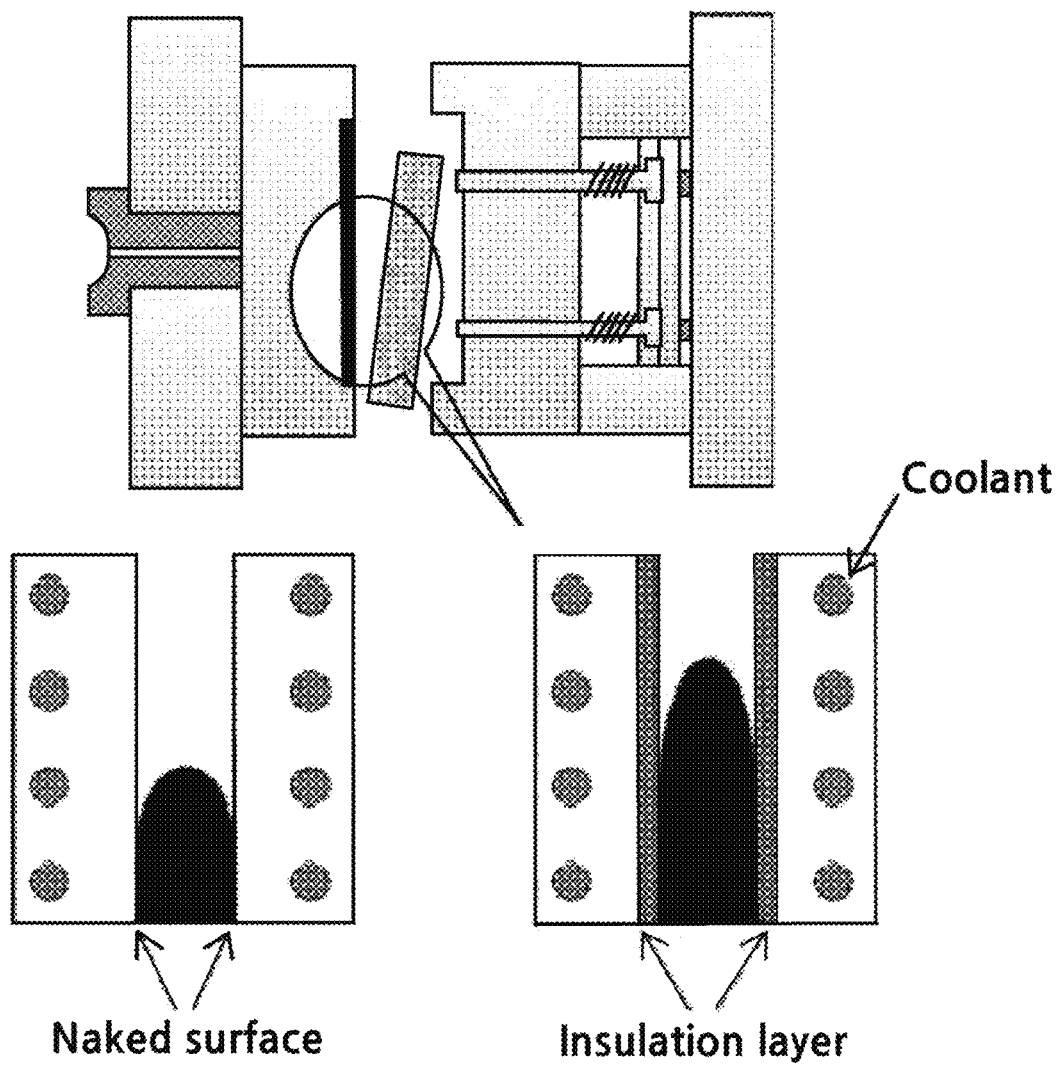

[FIG. 2]
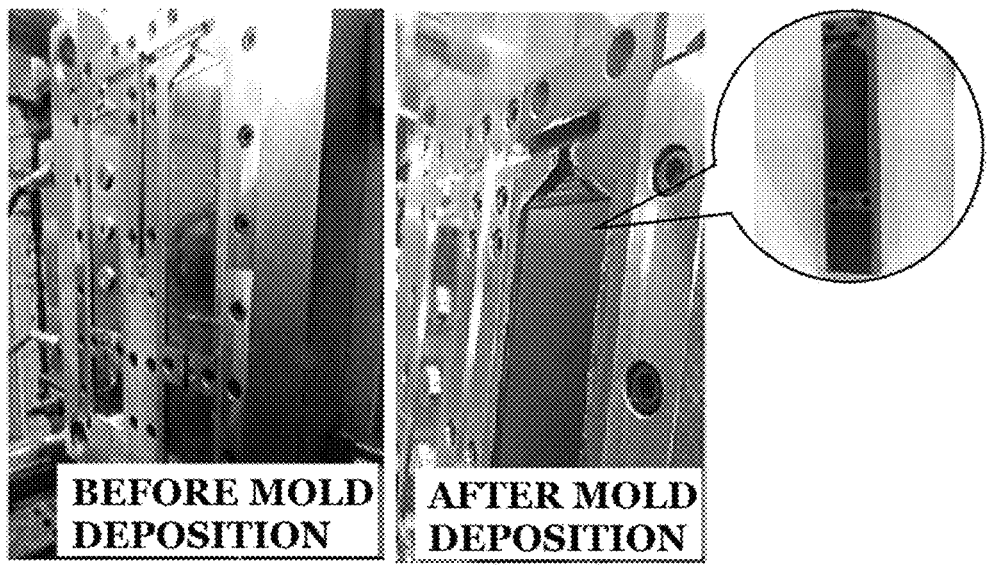
[FIG. 3]
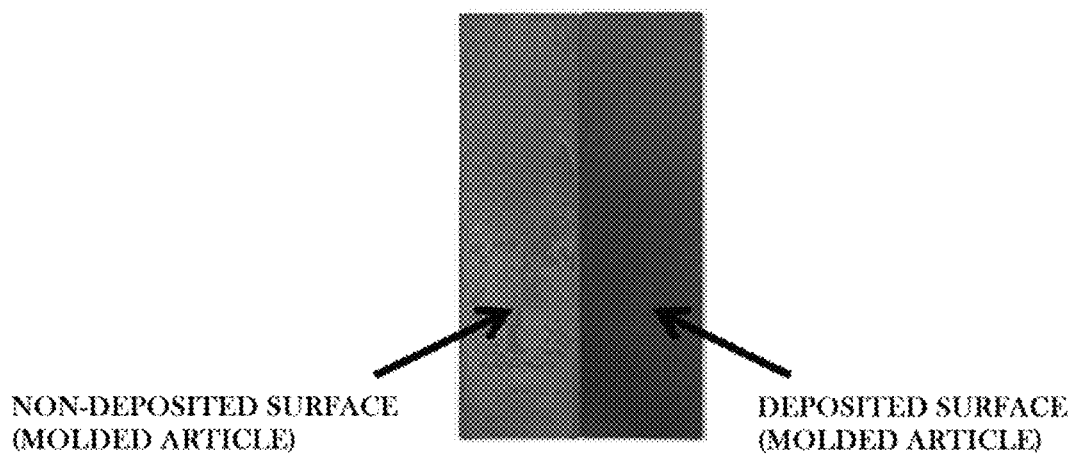

[FIG. 4]
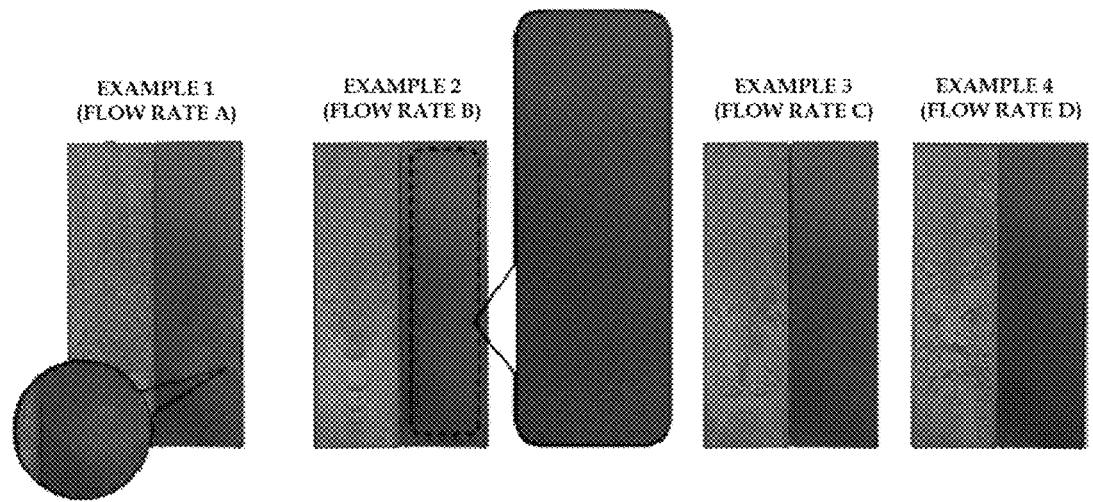
[FIG. 5]
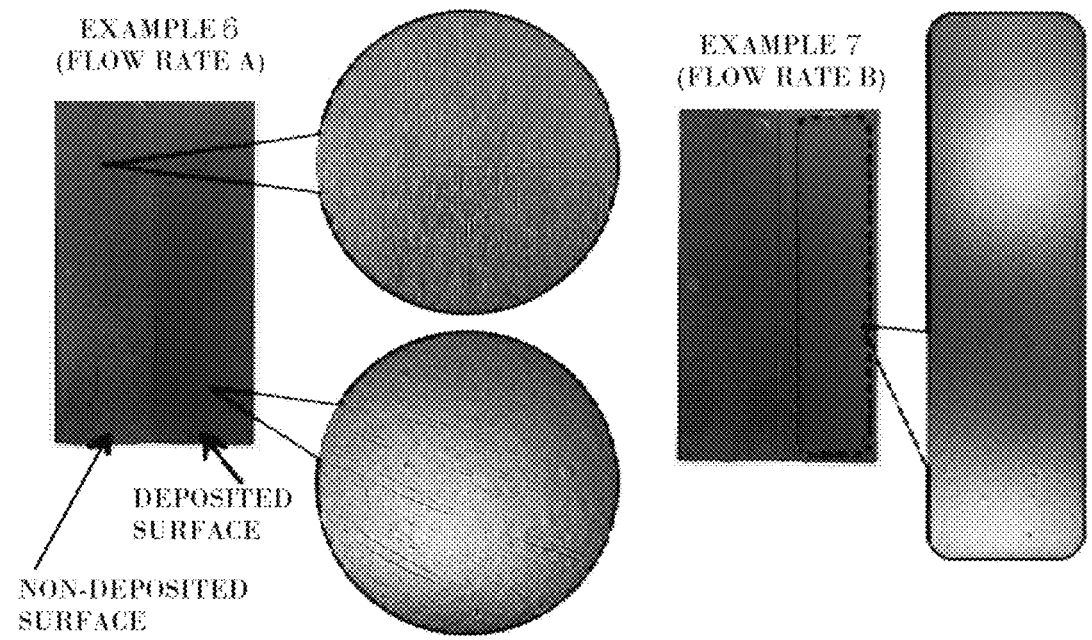

[FIG. 6]
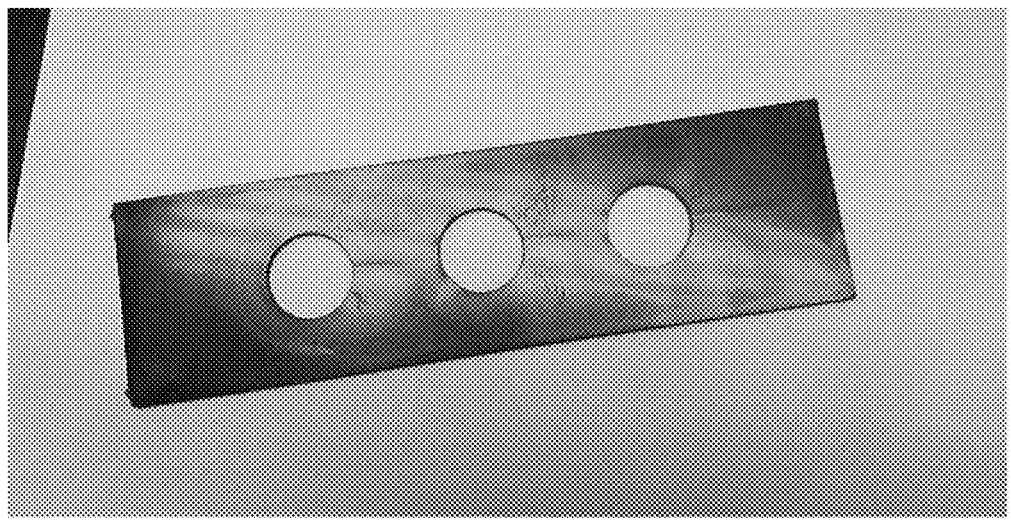
[FIG. 7]
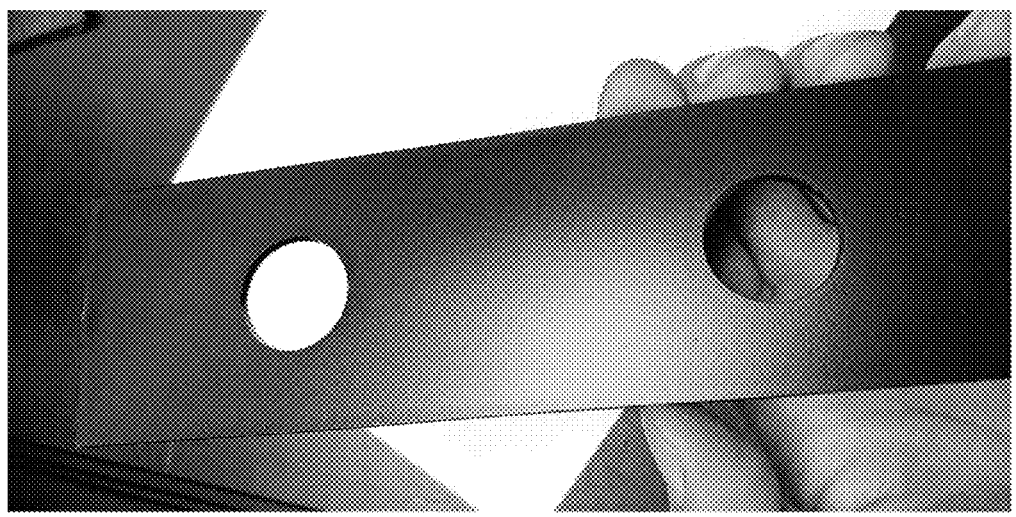

[FIG. 8]
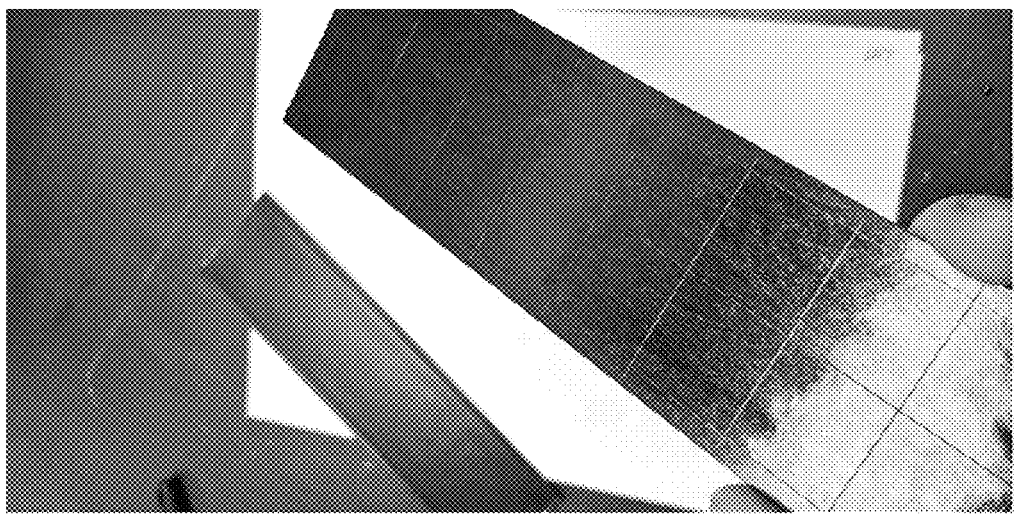
[FIG. 9]
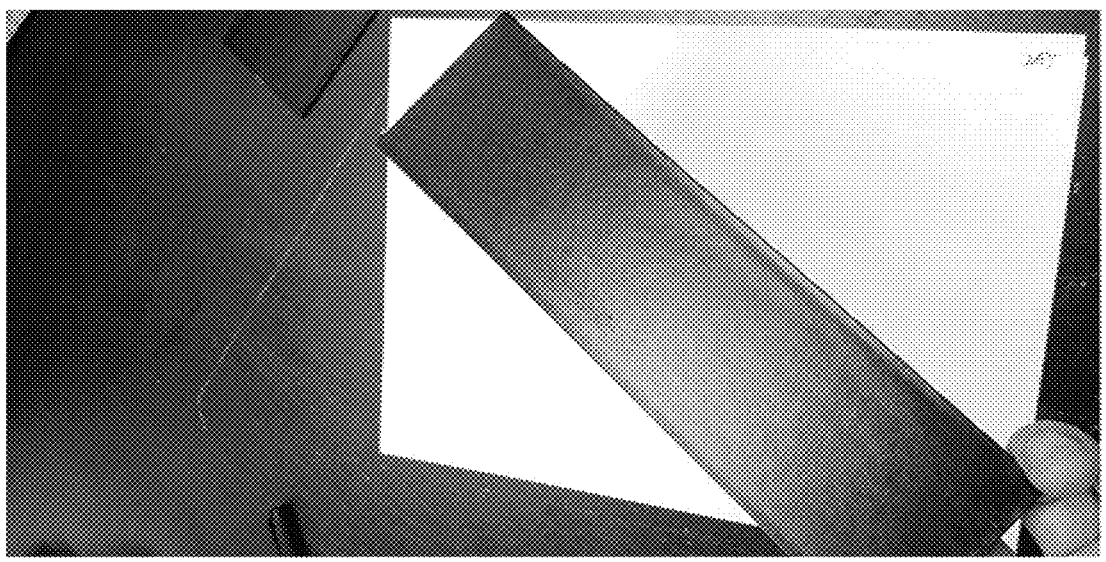

[FIG. 10]
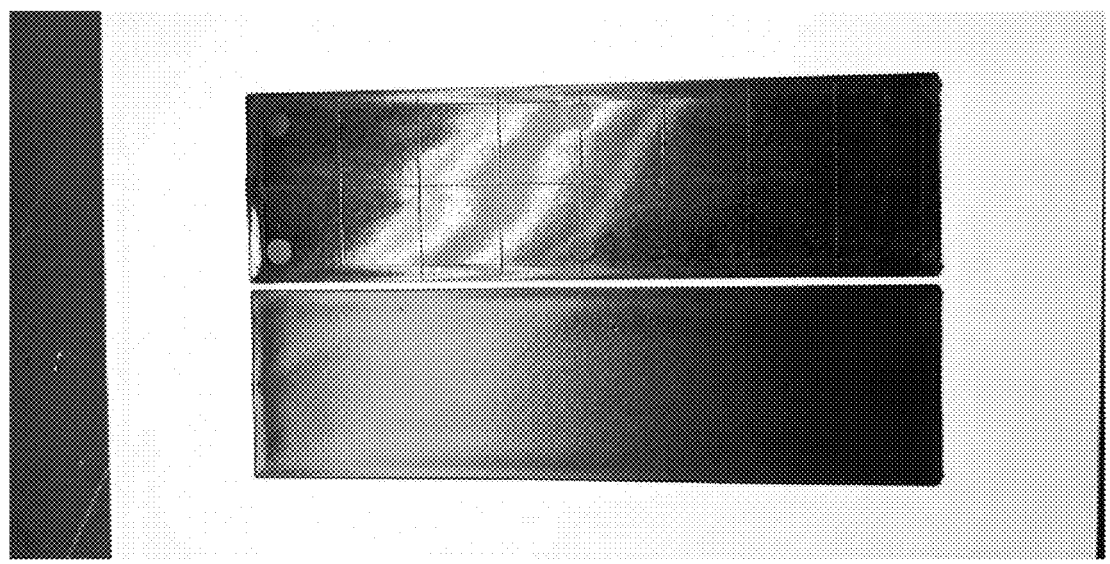
[FIG. 11]
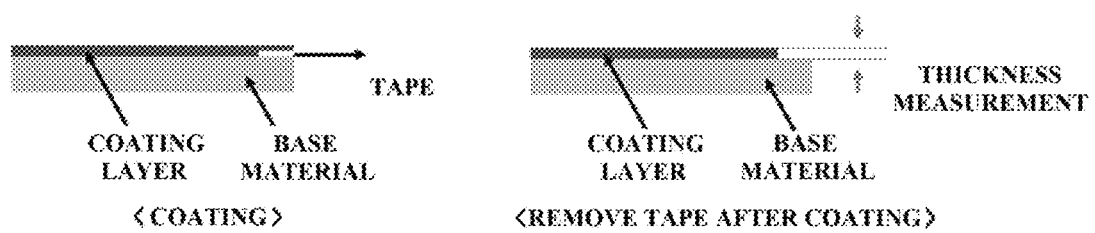

[FIG. 12]
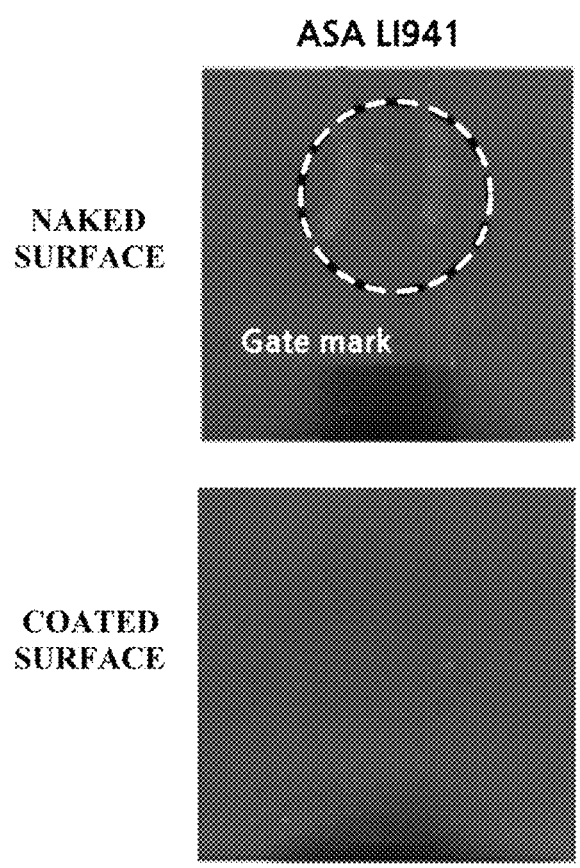

[FIG. 13]
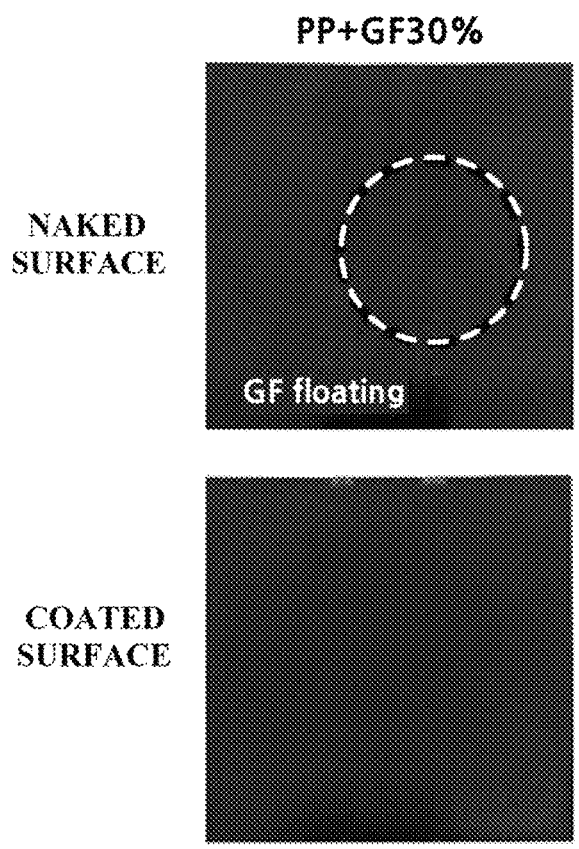

[FIG. 14]
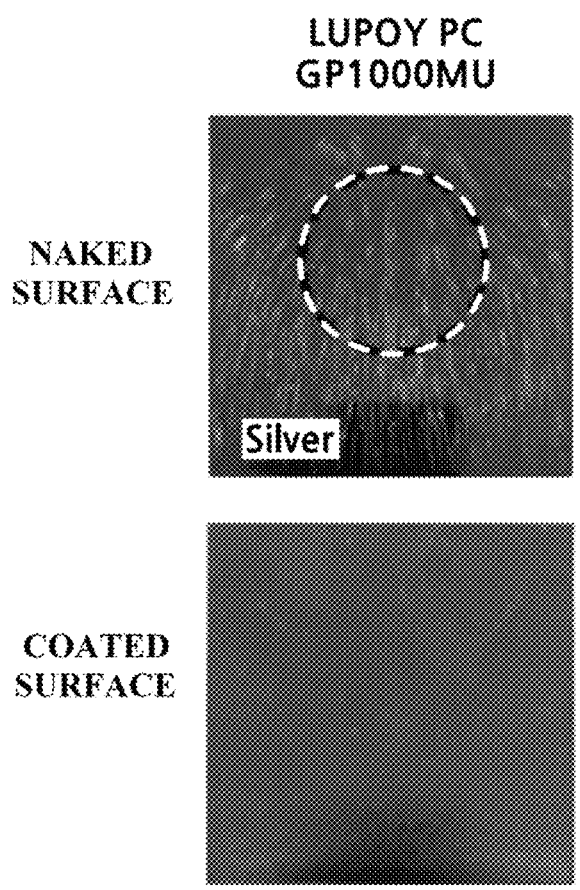
[FIG. 15]
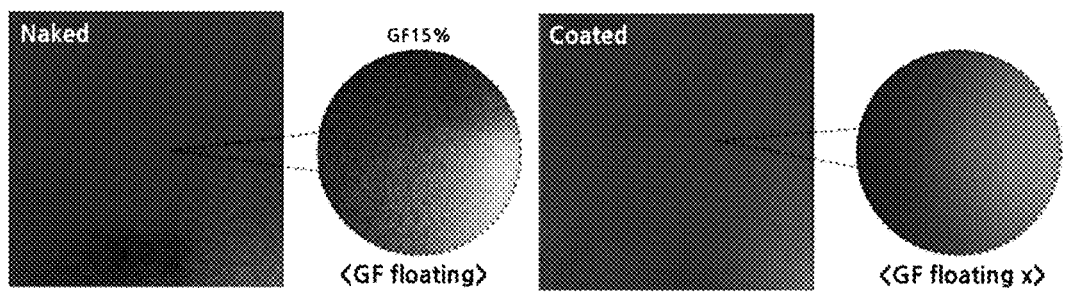

[FIG. 16]
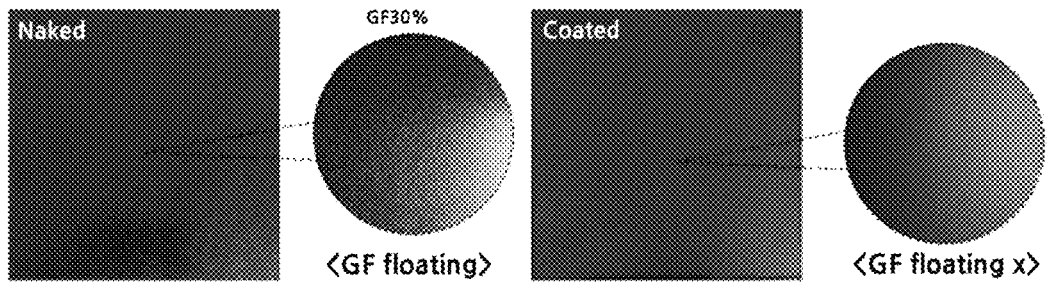
[FIG. 17]
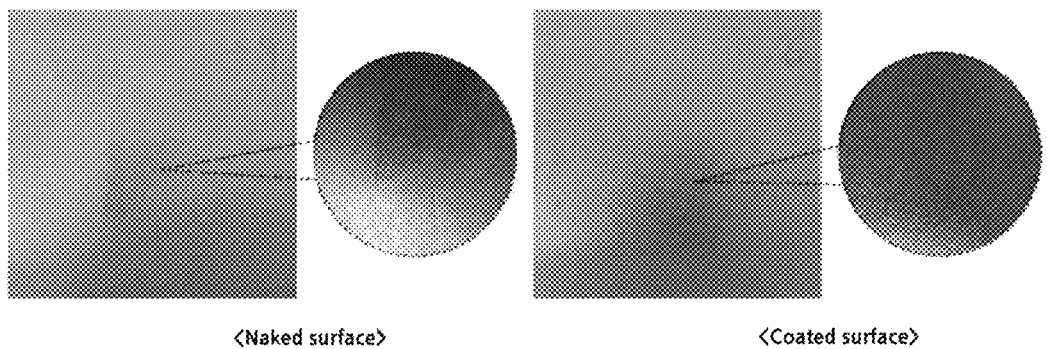
[FIG. 18]
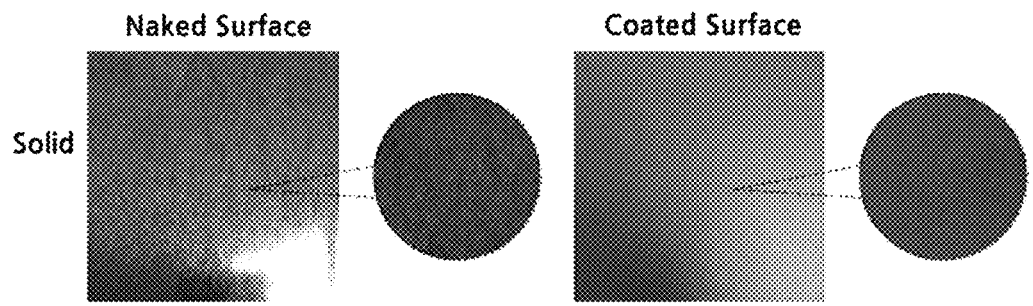

[FIG. 19]
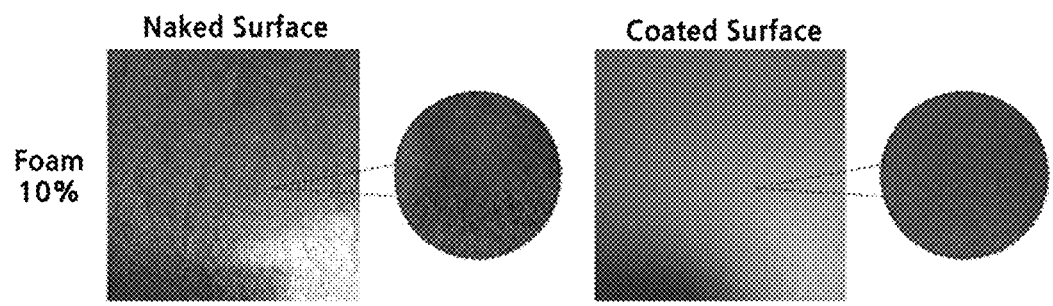

INJECTION MOLD, INJECTION MOLDING MACHINE INCLUDING INJECTION MOLD, AND METHOD FOR MANUFACTURING INJECTION-MOLDED PRODUCT USING INJECTION MOLDING MACHINE

The present application is a National Phase entry pursuant to 35 U.S.C. § 371 of International Application No. PCT/KR2019/016989 filed Dec. 4, 2019, and claims priority to and the benefit of Korean Patent Application No. 10-2018-0163101, filed on Dec. 17, 2018, and Korean Patent Application No. 10-2019-0154973, re-filed on Nov. 28, 2019, based on the priority of the above patent, in the Korean Intellectual Property Office, the disclosures of each of which are incorporated herein by reference in their entirety.

FIELD

The present invention relates to an injection mold, an injection molding machine including the injection mold, and a method of manufacturing an injection-molded product using the injection molding machine. More specifically, according to the present invention, even without special equipment such as a high speed heating/cooling molding apparatus or a counter-pressure molding apparatus, an injection-molded product having an aesthetically pleasing appearance without surface appearance defects such as swirl marks, silver streaks, glass fiber (G/F) floating, and weld lines may be manufactured. In addition, the injection mold of the present invention may be used semi-permanently without replacing a thermal insulation means. Therefore, according to the present invention, manufacturing process time and costs may be reduced, and manufacturing process precision may be improved.

BACKGROUND

Foam molding is mainly used to realize weight reduction of automobile parts and electronic products. In foam molding, by forming fine pores inside a molded article by expansion of a chemical foaming agent, the specific gravity of the molded article is reduced, whereby weight reduction can be achieved. However, when foam molding is used, although weight reduction can be realized, an aesthetically pleasing appearance cannot be realized by existing technologies due to gas generated by expansion of foaming gas. Major defects are swirl marks, silver streaks and so on, which may be generated by foaming gas. In this case, even when painting is performed, it is very difficult to mask such defects. Accordingly, the formed article could hardly be used as an exterior product. To overcome this problem, a method of covering a foamed product with leather or cloth is used. Also, to prevent swirl marks or silver streaks beforehand from forming on the surface of a molded article, rapid heating/cooling molding (RHCM) or counter-pressure molding has been developed and used. However, there are disadvantages such as high manufacturing costs and difficulty in control or operation. In addition, it is difficult to maintain appearance properties for a desired period.

RELATED ART DOCUMENTS

[Patent Documents] KR 1512908 B1

SUMMARY

Therefore, the present invention has been made in view of the above problems, and it is one object of the present invention to provide an injection mold, an injection molding machine including the injection mold, and a method of manufacturing an injection-molded product using the injection molding machine. According to the present invention, even without special equipment, an injection-molded product having an aesthetically pleasing appearance without surface appearance defects such as swirl marks, silver streaks, glass fiber (G/F) floating, and weld lines may be manufactured. In addition, the injection mold of the present invention may be used semi-permanently without replacing parts or the device. Therefore, according to the present invention, manufacturing process time and costs may be reduced, and manufacturing process precision may be improved.

The above and other objects can be accomplished by the present disclosure described below.

In accordance with one aspect of the present invention, there is provided an injection mold including a mold having a mold surface on which one or more deposition layers are formed, wherein the deposition layer includes a fluorinated resin homopolymer or polyether ether ketone (PEEK); an injection molding machine including the injection mold; and a method of manufacturing an injection-molded product using the injection molding machine.

In accordance with another aspect of the present invention, provided is an injection mold including a mold having a mold surface on which two or more deposition layers are formed, wherein a first deposition layer includes a fluorinated resin homopolymer, and a second deposition layer includes a fluorinated resin copolymer or polyether ether ketone (PEEK); an injection molding machine including the injection mold; and a method of manufacturing an injection-molded product using the injection molding machine.

As apparent from the foregoing, the present invention advantageously provides an injection mold, an injection molding machine including the injection mold, and a method of manufacturing an injection-molded product using the injection molding machine. According to the present invention, even without special equipment such as a rapid heating/cooling molding apparatus or a counter-pressure molding apparatus, an injection-molded product having an aesthetically pleasing appearance without surface appearance defects such as swirl marks, silver streaks, glass fiber (G/F) floating, and weld lines can be manufactured. In addition, the injection mold of the present invention can be used semi-permanently without inconvenience of cutting and installing a coating film every time a process is performed. Accordingly, manufacturing process time and costs can be reduced, and manufacturing process precision can be improved.

BRIEF DESCRIPTION OF THE DRAWINGS

FIG. 1 schematically illustrates an injection mold according to the present invention and a method of manufacturing an injection-molded product according to the present invention.

FIG. 2 shows examples of fixed side plates of an injection mold before and after a deposition layer (polymer coating layer) is formed according to the present invention.

FIG. 3 includes images of the front side (formed at a non-deposited surface of a mobile side plate) and the back side (formed at a deposited surface of a fixed side plate) of a molded article manufactured by performing foam molding using the injection mold of FIG. 2 having a fixed side plate on which a deposition layer is formed. Referring to FIG. 3, in contrast to the surface formed at the non-deposited surface of the mobile side plate, the surface formed at the deposited surface of the fixed side plate has an aesthetically pleasing appearance.

FIG. 4 includes images of the front side (formed at a non-deposited surface of a mobile side plate) and the back side (formed at a deposited surface of a fixed side plate) of each of the foam injection-molded products manufactured in Examples 1 to 4, in which the injection mold of FIG. 2 having a fixed side plate on which a deposition layer is formed is used and different injection flow rates are used. In each pair of images, the left image of one pair is a surface formed at a non-deposited surface, and the right image of one pair is a surface formed at a deposited surface. In all cases, the surface formed at a deposited surface, which is disposed on the right side, has appearance superior to that of the surface on the left side. In particular, Examples 2 to 4 having an injection flow rate of 40 cc/s or more (for flow rate B, C, or D) have appearance superior to that of Example 1 having an injection flow rate of less than 40 cc/s.

FIG. 5 includes images of the front side (formed at a non-deposited surface of a mobile side plate) and the back side (formed at a deposited surface of a fixed side plate) of each of the foam injection-molded products manufactured in Examples 6 and 7, in which the injection mold of FIG. 2 having a fixed side plate on which a deposition layer is formed is used and different resin compositions are used. In each pair of images, the left image is a surface formed at a non-deposited surface, and the right image is a surface formed at a deposited surface. In all cases, the surface formed at the deposited surface, which is disposed on the right side, has appearance superior to that of the surface on the left side. Example 7 having an injection flow rate of 40 cc/s or more (flow rate B) has appearance superior to that of Example 6 having an injection flow rate of less than 40 cc/s.

FIGS. 6 and 7 include images of the front side (formed at a non-deposited surface of a mobile side plate) and the back side (formed at a deposited surface of a fixed side plate) of an injection-molded product manufactured in Example 8, in which general injection molding is performed using an injection mold having a fixed side plate on which a deposition layer is formed and a mobile side plate on which a deposition layer is not formed and including a hole forming core pin. As shown in FIG. 6, it can be seen that, in the front side of an injection-molded product formed at a non-deposited surface of a mobile side plate, weld lines are clearly generated around holes. As shown in FIG. 7, it can be seen that, in the back side of an injection-molded product formed at a deposited surface of a fixed side plate, weld lines are absent around holes, showing excellent appearance.

FIGS. 8 and 9 include images of the front side (formed at a non-deposited surface of a mobile side plate) and the back side (formed at a deposited surface of a fixed side plate) of an injection-molded product manufactured in Example 9, in which general injection molding is performed using an injection mold having a fixed side plate on which a deposition layer is formed and a mobile side plate on which a deposition layer is not formed. As shown in FIG. 8, it can be seen that glass fiber (G/F) floating occurs on the front side of an injection-molded product formed at a non-deposited surface of a mobile side plate. As shown in FIG. 9, it can be seen that no G/F floating occurs on the back side of an injection-molded product formed at a deposited surface of a fixed side plate, showing smooth appearance.

FIG. 10 includes images of the front side (formed at a non-deposited surface of a mobile side plate) and the back side (formed at a deposited surface of a fixed side plate) of an injection-molded product manufactured in Example 10, in which general injection molding is performed using an injection mold having a fixed side plate on which a deposition layer is formed and a mobile side plate on which a deposition layer is not formed. As shown in the upper part of the image, it can be seen that G/F floating occurs on the front side of an injection-molded product formed at the non-deposited surface of the mobile side plate. As shown in the lower part of the image, it can be seen that no G/F floating occurs on the back side of an injection-molded product formed at the deposited surface of the fixed side plate, showing smooth appearance.

FIG. 11 includes drawings for explaining a method of measuring the thickness of a deposition layer (a coating layer) according to the present invention. As shown in FIG. 11, the thickness of a deposition layer may be determined simply by measuring the height difference between a deposited portion (a coating layer) and a non-deposited portion (a portion to which tape is attached). In this case, tape is attached to the end of a base material before a deposition (coating) process, and then the tape is removed after the deposition (coating) process.

FIGS. 12 to 14 include images of the front side (formed at a non-deposited surface of a mobile side plate) and the back side (formed at a deposited (coated) surface of a fixed side plate) of each injection-molded product manufactured by general injection molding in Examples 11 to 13. In this case, in each front side (marked as Naked) image, a portion where gate marks, glass fiber (G/F) floating, or silver streaks are present is indicated by a dotted circle for easy identification.

FIGS. 15 and 16 include images of the front side (formed at a non-deposited surface of a mobile side plate) and the back side (formed at a deposited (coated) surface of a fixed side plate) of each injection-molded product manufactured by general injection molding in Examples 14 and 15. In this case, to confirm whether glass fiber (G/F) floating occurs, one point of a front side (marked as Naked) image and one point of a back side (marked as Coated) image are enlarged and shown.

FIG. 17 includes images of the front side (formed at a non-deposited surface of a mobile side plate) and the back side (formed at a deposited surface of a fixed side plate) of an injection-molded product manufactured by general injection molding in Example 16. In this case, to check appearance, one point of a front side (marked as Naked surface) image and one point of a back side (marked as Coated surface) image are enlarged and shown.

FIGS. 18 and 19 include images of the front side (formed at a non-deposited surface of a mobile side plate) and the back side (formed at a deposited surface of a fixed side plate) of each injection-molded product manufactured by foam injection molding and general injection molding in Examples 17 and 18. In this case, to confirm whether glass fiber (G/F) floating occurs, one point of a front side (marked as Naked Surface) image and one point of a back side (marked as Coated Surface) image are enlarged and shown.

DETAILED DESCRIPTION

Hereinafter, an injection mold, an injection molding machine including the injection mold, and a method of manufacturing an injection-molded product using the injection molding machine according to the present invention will be described in detail.

The present inventors confirmed that, by forming a fluororesin insulation layer on a mold surface by using a deposition method in which fluororesin powder such as Teflon is sintered on a mold surface at high temperature and then curing is performed, during a molding operation the mold surface was instantaneously heated by a heat source of a resin being shot and filled into the mold, and the formation of a solidified layer of the resin was delayed. By this, the shape of the mold surface was transferred intact to the injection-molded resin by the growth pressure of foaming cells while the foaming rate of general foaming was secured. Thus, it was confirmed that an aesthetically pleasing appearance without swirl marks or silver streaks was obtained. Based on these results, the present inventors conducted further studies to complete the present invention.

The injection mold of the present invention includes a mold having a mold surface on which one or more deposition layers are laminated, wherein the deposition layer includes a fluorinated resin homopolymer or polyether ether ketone (PEEK). In this case, even without special equipment, an injection-molded product having an aesthetically pleasing appearance without swirl marks or silver streaks may be manufactured. In addition, the injection mold may be used semi-permanently without inconvenience of cutting and installing a thermal insulation means every time a molding process is performed. In addition, manufacturing process time and costs may be reduced, and manufacturing process precision may be increased.

Also, the injection mold of the present invention includes a mold having a mold surface on which two or more deposition layers are laminated, wherein a first deposition layer includes a fluorinated resin homopolymer or polyether ether ketone (PEEK), and a second deposition layer includes a fluorinated resin copolymer or polyether ether ketone (PEEK). In this case, even without special equipment, an injection-molded product having an aesthetically pleasing appearance without swirl marks or silver streaks may be manufactured. In addition, the injection mold may be used semi-permanently without inconvenience of cutting and installing a thermal insulation means every time a process is performed. In addition, manufacturing process time and costs may be reduced, and manufacturing process precision may be increased.

Hereinafter, the technical features of each configuration of the injection mold of the present invention will be described in detail, but each technical feature may independently define the configuration of the injection mold of the present invention, or two or more technical features may simultaneously define the configuration of the injection mold of the present invention.

For example, a total thickness of the deposition layers may be 20 to 100 μm, preferably 40 to 80 μm, more preferably 45 to 80 μm, still more preferably 45 to 75 μm, most preferably 50 to 70 μm. Within this range, by thermal insulation, cooling delay effect may be improved, and thus an injection-molded product having an aesthetically pleasing appearance may be manufactured. In addition, processing time may be reduced, economy may be improved, and appearance properties may be excellent.

In the present invention, the thickness of a deposition layer may be measured using a thickness measurement method commonly used in the art to which the present invention pertains. In one embodiment, as shown in FIG. 11, thickness may be determined simply by measuring the height difference between a deposited portion (a coating layer) and a non-deposited portion (a portion to which tape is attached).

For example, the first deposition layer may have a thickness of 1 to 50 μm, preferably 10 to 50 μm, more preferably 10 to 40 μm, still more preferably 20 to 30 μm. Within this range, adhesion may be excellent, and thermal insulation effect may be improved. In addition, processing time may be reduced, and economic efficiency may be excellent.

For example, the second deposition layer may have a thickness of 10 to 80 μm, preferably 20 to 80 μm, more preferably 40 to 70 μm, still more preferably 50 to 70 μm, most preferably 60 to 70 μm. Within this range, a desired level of thermal insulation may be achieved, processing time may be reduced, and economic efficiency and appearance properties may be excellent.

For example, the deposition layer may be formed in one or more layers, preferably two or three layers, more preferably two layers. In this case, a desired level of thermal insulation may be fully achieved, processing time may be reduced, and economic efficiency and appearance properties may be excellent.

For example, the deposition layer may be formed by applying a coating paint in a liquid or powder form onto a mold surface using spray coating, dip coating, spin coating, or the like and then performing heat treatment or sinter drying at 150° C. or more or 150 to 450° C., preferably 380 to 450° C., more preferably 400 to 450° C.

For example, the injection mold may be a foam injection mold or a non-foam injection mold, i.e., a general injection mold. In this case, even without special equipment such as a high speed heating/cooling molding apparatus or a counter-pressure molding apparatus, a foam or general injection-molded product having an aesthetically pleasing appearance without surface appearance defects such as swirl marks, silver streaks, G/F floating, and weld lines may be manufactured.

For example, the deposition layer may be a sinter-hardened deposition layer. In this case, a desired level of thermal insulation may be achieved, and adhesion and durability may be excellent.

For example, the fluorinated resin homopolymer may include one or more selected from the group consisting of polytetrafluoroethylenes (PTFEs), polychlorotrifluoroethylenes (PCTFEs), polyvinylidene fluorides (PVDFs), and polyvinyl fluorides (PVFs). Preferably, the fluorinated resin homopolymer includes polytetrafluoroethylenes (PTFEs). In this case, surface lubrication properties may be improved, and a seizure phenomenon may be prevented. Accordingly, occurrence of a seizure phenomenon on a mold surface due to gas generated during molding may be prevented, thereby reducing molding defects and increasing the cleaning cycle of a mold.

For example, the fluorinated resin copolymer may include one or more selected from the group consisting of perfluoroalkoxy (PFA) resins, tetrafluoroethylene-hexafluoropropylene (FEP) copolymers, ethylene tetrafluoroethylene (ETFE) copolymers, and ethylene chlorotrifluoroethylene (ECTFE) copolymers. Preferably, the fluorinated resin copolymer includes perfluoroalkoxy (PFA) resins. In this case, thermal insulation effect and appearance properties may be excellent.

For example, the mold surface may include a mold surface of a fixed side plate, a mold surface of a mobile side plate, or both, and may be appropriately selected depending on required properties of an injection-molded product and economic efficiency without particular limitation.

For example, the fixed side plate may include a sprue, a runner, a gate, and a cavity side, and the mobile side plate may include a core side and an ejector.

For example, the gate may be a side gate.

Unless specifically defined herein, other components that are involved with methods of manufacturing a non-foam injection mold or a foam injection mold; a non-foam injection molding machine or a foam injection molding machine; and a non-foam (general) injection-molded product or a foam injection-molded product are not particularly limited if they are techniques commonly used in the art to which the present invention pertains may be used. In the present specification, description thereof is omitted to explain the present invention clearly.

The injection mold of the present invention will be described with reference to the accompanying drawings.

FIG. 1 schematically illustrates an injection mold according to the present invention and a method of manufacturing an injection-molded product according to the present invention, and FIG. 2 shows an example of a fixed side plate of an injection mold before and after a deposition layer is formed according to the present invention. FIG. 3 includes images of the front side (formed at a non-deposited surface of a mobile side plate) and the back side (formed at a deposited surface of a fixed side plate) of an injection-molded product (molded article) manufactured by performing foam molding using the injection mold of FIG. 2 having a fixed side plate on which a deposition layer is formed. Referring to FIG. 3, in contrast to the surface of the molded article formed at the non-deposited surface, the surface of the molded article formed at the deposited surface has an aesthetically much more pleasing appearance.

Referring to FIG. 1, in the left side of the upper image, a fixed side plate is shown, and in the right side of the upper image, a mobile side plate is shown. When a molten resin composition is fed through a sprue from a nozzle on the left side and a mold cavity is filled with the molten resin composition, in the fixed side plate on which the deposition layer according to the present invention is formed, a mold surface is instantaneously heated by a heat source of the molten resin composition, formation of a solidified layer is delayed by thermal insulation effect, the shape of the mold surface is transferred intact to the molten resin composition by the growth pressure of foaming cells while the foaming rate of general foaming is secured, and an injection-molded product without swirl marks or silver streaks is manufactured. Then, the mobile side plate moves to eject the injection-molded product from the injection mold. The lower left image schematically shows a mold surface (marked as Naked surface) on which the deposition layer according to the present invention is not formed, and the lower right image schematically shows a mold surface (marked as Insulation layer) on which the deposition layer according to the present invention is formed. In the case of the mold surface, shown on the right side, on which the deposition layer is formed, as described above, due to thermal insulation effect, formation of a solidified layer is delayed, and thus the shape of the mold surface is transferred intact onto the surface of an injection-molded product by the growth pressure of foaming cells, thereby ensuring a surface having an aesthetically pleasing appearance without swirl marks or silver streaks. In the drawings, the red part in the plate indicates the molten resin composition being filled, and illustration of the runner and the gate connected from the sprue to the cavity is omitted.

Referring to FIG. 2, the left image is a fixed side plate (before mold deposition) on which a deposition layer is not formed, and the right image is a fixed side plate (after mold deposition) on which a deposition layer is formed. To manufacture the fixed side plate, as shown in the right, on which a deposition layer is formed, the fixed side plate on the left side was subjected to cleaning processes such as degreasing and ultrasonic cleaning and then coated with polytetrafluoroethylene (PTFE) powder using spray coating, dip coating, or spin coating. Then, the fixed side plate was sintered by heating at 400° C. or more, more specifically 400 to 450° C., and coated with perfluoroalkoxy (PFA) resin powder using spray coating, dip coating, or spin coating, followed by heat drying at 400° C. or more, more specifically 400 to 450° C. In this case, the thickness of a cavity was 2 to 4 mm. A mobile side plate corresponding to the fixed side plate is not shown in the drawings. Since the design of the mobile side plate depends on the shape of the fixed side plate, it is apparent to those skilled in the art, and therefore illustration of the mobile side plate is omitted to avoid any inconvenience.

The injection molding machine of the present invention is an injection molding machine including an injection mold, an injection apparatus, and an actuator, and the injection mold includes the above-described injection mold.

The injection molding machine of the present invention shares technical features with the above-described injection mold, and thus repeated description will be omitted.

For example, the injection apparatus includes a hopper through which a resin composition is fed, a heating cylinder for plasticizing and moving the fed resin composition and one or more screw(s). Heating cylinders commonly used in non-foam (general) injection molding machines or foam injection molding machines may be used as the heating cylinder of the present invention without particular limitation. For example, the heating cylinder may include a heater mounted outside the cylinder to supply heat into the cylinder to melt a fed resin composition and a nozzle for spraying a molten resin composition into an injection mold.

For example, the screw may consist of a screw head; a non-return valve; and a continuous or discontinuous screw body.

Valves for preventing backflow of a plasticized resin composition, i.e., a molten resin composition, in a heating cylinder used in an injection molding machine may be used as the non-return valve of the present invention without particular limitation. For example, the non-return valve may include a check ring.

The continuous screw body is a screw body in which a flight is formed continuously without disconnection in the middle, preferably a screw body in which a flight is formed continuously without disconnection over a feed zone, a transition zone, and a metering zone. In this case, a fed resin composition may be easily plasticized. The discontinuous screw body is a screw body in which a flight is disconnected in the middle.

The thickness of the cavity may be adjusted depending on the design of an injection-molded article without particular limitation. For example, the cavity may have a thickness of 1 to 15 mm, 2 to 10 mm, or 2 to 5 mm. Within this range, mechanical properties may be excellent, and an aesthetically pleasing appearance may be secured.

In the present invention, cavity thickness refers to the height of a space in the vertical direction from the bottom of a plate.

Drive motors applicable to general injection molding machines may be used as the actuator of the present invention without particular limitation. For example, the actuator may include a hydraulic cylinder and a hydraulic motor for screw rotation.

A method of manufacturing an injection-molded product according to the present invention includes a step of injection-molding a resin composition using the above-described injection molding machine. According to the method of the present invention, even without special equipment such as a rapid heating/cooling molding apparatus or a counter-pressure molding apparatus, an injection-molded product having an aesthetically pleasing appearance without swirl marks, silver streaks, weld lines, or G/F floating may be manufactured. In addition, the injection molding machine may be used semi-permanently without inconvenience of cutting and installing a coating film every time a process is performed. Accordingly, manufacturing process time and costs may be reduced, and manufacturing process precision may be improved.

In the injection molding, an injection flow rate is preferably 40 cc/s or more, more preferably 40 to 2000 cc/s, still more preferably 40 to 1000 cc/s, still more preferably 40 to 200 cc/s, still more preferably 40 to 112 cc/s, most preferably 40 to 100 cc/s. Within this range, an injection-molded product having an aesthetically pleasing appearance may be manufactured. For reference, an injection flow rate may be specified by a user when inputting molding conditions in an injection molding machine.

For example, the resin composition may include 100 parts by weight of a thermoplastic resin; 0 to 150 parts by weight or 0.1 to 150 parts by weight of a filler; and 0.1 to 10 parts by weight or 0.1 to 8 parts by weight of additives. Within this range, reinforcement effect may be obtained, and an aesthetically pleasing appearance may be secured.

Fillers commonly used in the art to which the present invention pertains may be used as the filler of the present invention without particular limitation. For example, the filler may include one or more selected from the group consisting of mineral fillers, glass fibers, carbon fibers, carbon black, and carbon nanotubes (CNTs). Preferably, the filler includes glass fibers. In this case, reinforcement effect may be obtained, and an aesthetically pleasing appearance may be secured.

As another example, the filler may be a master batch including a carrier resin and filler components. Thermoplastic resins that may be molded into foam injection-molded products or injection-molded products may be used as the carrier resin without particular limitation. For example, the carrier resin may be selected within a range of thermoplastic resins according to the present invention. For example, the filler components may be pigments, or the like. In this case, the filler components may be included in the master batch in an amount of 30 to 80% by weight or 40 to 60% by weight. Within this range, desired effects may be fully expressed without deterioration in other physical properties.

For example, when the filler is carbon black, carbon black may be included in an amount of 0.1 to 10 parts by weight, 0.5 to 8 parts by weight, or 1 to 5 parts by weight. Within this range, reinforcement effect may be obtained, and an aesthetically pleasing appearance may be secured.

As another example, when the filler includes one or more selected from the group consisting of mineral fillers, glass fibers, carbon fibers, and carbon nanotubes (CNTs), the filler may be included in an amount of 0.5 to 120 parts by weight, preferably 1 to 100 parts by weight, more preferably 5 to 80 parts by weight, most preferably 10 to 60 parts by weight. Within this range, reinforcement effect may be obtained, and an aesthetically pleasing appearance may be obtained.

Preferably, the additives may include one or more selected from the group consisting of lubricants, impact modifiers, antioxidants, UV stabilizers, and chemical foaming agents. In this case, an aesthetically pleasing appearance may be achieved, and desired effects of the additives may be fully expressed.

As another example, the additives may be included in an amount of 0.5 to 8 parts by weight, 1 to 5 parts by weight, or 2 to 4 parts by weight. Within this range, an aesthetically pleasing appearance may be achieved, and desired effects of the additives may be fully expressed.

For example, the chemical foaming agent may be an inorganic blowing agent. In this case, appearance properties may be excellent.

For example, the inorganic blowing agent may include one or more selected from the group consisting of sodium bicarbonate, potassium bicarbonate, ammonium bicarbonate, sodium carbonate, and ammonium carbonate without particular limitation. In this case, appearance properties may be excellent.

Thermoplastic resins that may be molded into foam injection-molded products or non-foam (general) injection-molded products may be used as the thermoplastic resin of the present invention without particular limitation. For example, the thermoplastic resin may include one or more selected from the group consisting of polypropylene (PP) resins, ABS resins, ASA resins, PBTs, PA6, PA66, polycarbonates (PCs), PC/ABS alloys, polymethyl methacrylates (PMMAs), polyesters, SAN resins, PSs, PVCs, and polyethylene (PE) resins. In this case, an aesthetically pleasing appearance may be achieved while maintaining the intrinsic properties of a resin.

For example, the injection molding may be foam molding performed according to a short shot molding method. In this case, a foam product having an aesthetically pleasing appearance without surface appearance defects such as swirl marks, silver streaks, G/F floating, and weld lines may be manufactured.

In the present invention, short shot molding methods commonly used in the art to which the present invention pertains may be used as the short shot molding method of the present invention without particular limitation. For example, the short molding method may be a method of filling a plasticized (i.e., molten) foam molding resin composition into a cavity and completing molding by cell growth.

In addition, the injection molding may be foam molding performed according to a core-back molding method in which a cavity is filled with a molten foam resin composition, a mobile side mold, i.e., a core, pulls back, and molding is completed by cell growth. In this case, a foam product having an aesthetically pleasing appearance without swirl marks or silver streaks may be manufactured.

In the present description, configuration that may be commonly employed in the art to which the present invention pertains is not described, but such a configuration may be easily selected by those skilled in the art as necessary, and thus, the present invention is not affected thereby.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Example 1

A foam molding resin composition containing 100 parts by weight of an ABS resin (AF365F, LG Chemical Co.), 25 parts by weight of a milled glass fiber as a filler, and 3 parts by weight of LP338 (DONGJIN Co.) as a blowing agent was fed batchwise into a general injection apparatus including a hopper, a cylinder, and a screw, and melting and kneading were performed at a molding temperature of 230° C. Then, according to injection flow rates and mold temperatures shown in Table 1 below, the resin composition was injected into an injection mold including a fixed side plate, shown in FIG. 2, on which a deposition layer is formed, and a mobile side plate (not shown) corresponding to the fixed side plate, and cells were grown by foaming according to a short molding method to obtain a final foam product. As described above, on the fixed side plate, a first deposition layer having a thickness of 30 μm was formed of polytetrafluoroethylene (PTFE), and then a second deposition layer having a thickness of 40 μm was formed of a perfluoroalkoxy (PFA) resin. In this case, by mirror-processing the mobile side plate without deposition of a fluororesin, the effect of the deposition layer according to the present invention may be confirmed by comparing the appearances of the front and back sides of the injection-molded product. In addition, specifications of an injection molding machine used in the injection molding are as follows. Maximum injection speed: 112 mm/s (79 cc/s); maximum clamping force: 150 Ton; screw diameter: 45 mm; and maximum injection pressure: 2,210 bar.

Examples 2 to 5

A manufacturing process was performed in the same manner as in Example 1, except that injection flow rates shown in Table 1 below were applied.

Example 6

A manufacturing process was performed in the same manner as in Example 1, except that a foam molding resin composition containing 100 parts by weight of a polypropylene resin (SEETEC H7700), 1 part by weight of carbon black MB (PP base, carbon content: 50% by weight) as a filler, and 3 parts by weight of LP338 (DONGJIN Co.) as a blowing agent was used instead of the foam molding resin composition of Example 1.

Example 7

A manufacturing process was performed in the same manner as in Example 6, except that injection flow rates shown in Table 2 below were applied.

Example 8

A manufacturing process was performed in the same manner as in Example 1, except that the injection mold used in Example 1 was replaced by an injection mold including a hole forming core pin (other conditions were the same), and injection flow rates shown in Table 3 below were applied.

Example 9

A manufacturing process was performed in the same manner as in Example 2, except that a general injection molding resin composition containing 100 parts by weight of a polypropylene resin (SEETEC H7700) and 40 parts by weight of a long glass fiber (LUFLO LG2400, LG Chemical Co.) as a filler was used instead of the foam molding resin composition of Example 2, and a general injection molding method was used instead of the short molding method.

Example 10

A manufacturing process was performed in the same manner as in Example 2, except that a general injection molding resin composition containing 100 parts by weight of a polypropylene resin (SEETEC H7700) and 50 parts by weight of a glass fiber (LUPOY SC2502, LG Chemical Co.) as a filler was used instead of the foam molding resin composition of Example 2, and a general injection molding method was used instead of the short molding method.

Example 11

A manufacturing process was performed in the same manner as in Example 1, except that a fixed side plate on which a 25 to 30 μm thick first deposition layer formed of a polyether ether ketone (PEEK) and a 15 to 20 μm thick second deposition layer formed of a polyether ether ketone (PEEK) were formed was used, injection flow rate was set to 80 cc/s, an acrylate-styrene-acrylonitrile resin (ASA LI941, LG Chemical Co.) as a general injection molding resin was used instead of the foam molding resin composition, and a general injection molding method was used instead of the short molding method.

Example 12

A manufacturing process was performed in the same manner as in Example 11, except that, instead of the ASA resin of Example 11, a composition containing 70 parts by weight of a polypropylene (SEETEC H7700) resin and 50 parts by weight of a glass fiber (LUPOY SC2502, LG Chemical Co.) was used.

Example 13

A manufacturing process was performed in the same manner as in Example 11, except that, instead of the ASA resin of Example 11, a polycarbonate (PC) resin (LUPOY PC GP1000MU, LG Chemical Co.) was used.

Example 14

A manufacturing process was performed in the same manner as in Example 1, except that, instead of the fixed side plate of Example 1, a fixed side plate on which only a 30 μm thick PTFE first deposition layer is formed was used, injection flow rate was set to 80 cc/s, and a general injection molding resin composition containing 85% by weight of polyamide 6 (PA6) and 15% by weight of a glass fiber (G/F) was used instead of the foam molding resin composition.

Example 15

A manufacturing process was performed in the same manner as in Example 14, except that a general injection molding resin composition containing 70% by weight of polyamide 6 (PA6) and 30% by weight of a glass fiber (G/F) was used.

Example 16

A manufacturing process was performed in the same manner as in Example 14, except that, instead of the general injection molding resin composition of Example 14, a polyester-based thermoplastic elastomer (Keyflex-BT 1028D, LG Chemical Co.) was used.

Example 17

A manufacturing process was performed in the same manner as in Example 14, except that, instead of the general injection molding resin composition of Example 14, a long fiber-reinforced thermoplastic resin (LUFLO LG2250B, LG Chemical Co.) containing 30% by weight of a long fiber was used.

Example 18

A manufacturing process was performed in the same manner as in Example 17, except that 3 parts by weight of a chemical blowing agent was fed, and foam injection molding was performed according to a short shot molding method.

Test Examples

Both surfaces of each of the foam products manufactured in Examples 1 to 18 were photographed, and the images were enlarged to visually confirm whether swirl marks, silver streaks, G/F floating, or weld lines were generated. The results are shown in Tables 1 to 6 below and FIGS. 4 to 19.

sition layer was formed, on the surface of an injection-molded product formed by a mold surface on which the deposition layer formed of a fluororesin according to the present invention was formed, the number of swirl marks and silver streaks was greatly reduced, or no swirl marks and no silver streaks were generated. In addition, overall cycle time was not affected. In particular, when injection molding was performed at an injection flow rate of 40 cc/s or more, no swirl marks and no silver streaks were generated, indicating that appearance was greatly improved.

TABLE 2

| Classification | Example 6 | | Example 7 | |
|---|---|---|---|---|
| | Fixed side | Mobile side | Fixed side | Mobile side |
| Mold insulation coating | Presence | Absence | Presence | Absence |
| Injection flow rate (cc/s) | 16 (A) | | 40 (B) | |
| Mold temperature (° C.) | 40 | | 40 | |
| Injection temperature (° C.) | 230 | | 230 | |
| Results | | | | |
| Swirl marks | Few | Many | None | Many |
| Silver streaks | Few | Many | None | Many |

TABLE 1

| Classification | Example 1 | | Example 2 | | Example 3 | | Example 4 | | Example 5 | |
|---|---|---|---|---|---|---|---|---|---|---|
| | Fixed side | Mobile side | Fixed side | Mobile side | Fixed side | Mobile side | Fixed side | Mobile side | Fixed side | Mobile side |
| Mold insulation coating | Presence | Absence | Presence | Absence | Presence | Absence | Presence | Absence | Presence | Absence |
| Injection flow rate (cc/s) | 16 (A) | | 40 (B) | | 80 (C) | | 100 (D) | | 112 | |
| Mold temperature (° C.) | 40 | | 40 | | 40 | | 40 | | 40 | |
| Injection temperature (° C.) | 230 | | 230 | | 230 | | 230 | | 230 | |
| Results | | | | | | | | | | |
| Swirl marks | Few | Many | None | Many | None | Many | None | Many | None | Many |
| Silver streaks | Few | Many | None | Many | None | Many | None | Many | None | Many |

As shown in Table 1 and FIG. 4, since the surface of an injection-molded product formed by a mold surface (a fixed side plate) on which the deposition layer formed of a fluororesin according to the present invention was formed was insulated, a mold surface was indirectly heated by a heat source of a molten resin composition, and generation of a solidified layer was delayed. Accordingly, compared to the surface of an injection-molded product formed by a non-deposited (marked as Naked) mold surface (a mobile side plate) in which cooling proceeded as soon as a molten resin composition contacted the mold surface because no depo- As shown in Table 2 and FIG. 5, since the surface of an injection-molded product formed by a mold surface (a fixed side plate) on which the deposition layer formed of a fluororesin according to the present invention was formed was insulated, a mold surface was indirectly heated by a heat source of a molten resin composition, and generation of a solidified layer was delayed. Accordingly, compared to the surface of an injection-molded product formed by a non-deposited mold surface (a mobile side plate) in which cooling proceeded as soon as a molten resin composition contacted the mold surface because no deposition layer was formed, the number of swirl marks and silver streaks was greatly reduced, or no swirl marks and no silver streaks were generated. In addition, overall cycle time was not affected. In particular, when injection molding was performed at an injection flow rate of 40 cc/s or more, no swirl marks and no silver streaks were generated, indicating that appearance was greatly improved.

TABLE 3

|  | Example 8 | | Example 9 | | Example 10 | |
| --- | --- | --- | --- | --- | --- | --- |
| Classification | Fixed side | Mobile side | Fixed side | Mobile side | Fixed side | Mobile side |
| Mold insulation coating | Presence | Absence | Presence | Absence | Presence | Absence |
| Injection flow rate (cc/s) | 40 (B) | | 40 (B) | | 40 (B) | |
| Mold temperature (° C.) | 40 | | 40 | | 40 | |
| Injection temperature (° C.) | 230 | | 230 | | 230 | |
| Results | | | | | | |
| Weld lines | None | Many | — | — | — | — |
| G/F floating | — | — | None | Many | None | Many |

As shown in Table 3 and FIGS. 6 to 10, since the surface of an injection-molded product formed by a mold surface (a fixed side plate) on which the deposition layer formed of a fluororesin according to the present invention was formed was insulated, a mold surface was indirectly heated by a heat source of a molten resin composition, and generation of a solidified layer was delayed. Accordingly, compared to the surface of an injection-molded product formed by a non-deposited mold surface (a mobile side plate) in which cooling proceeded as soon as a molten resin composition contacted the mold surface because no deposition layer was formed, no weld lines were generated, or no G/F floating occurred, indicating that appearance was excellent.

TABLE 4

|  | | Example 11 | | Example 12 | | Example 13 | |
| --- | --- | --- | --- | --- | --- | --- | --- |
| Classification | | Fixed side | Mobile side | Fixed side | Mobile side | Fixed side | Mobile side |
| Mold insulation coating | | Presence | Absence | Presence | Absence | Presence | Absence |
| First deposition layer | Component | PEEK | X | PEEK | X | PEEK | X |
| | Thickness | 25 to 30 | X | 25 to 30 | X | 25 to 30 | X |
| Second deposition layer | Component | PEEK | X | PEEK | X | PEEK | X |
| | Thickness | 15 to 20 | X | 15 to 20 | X | 15 to 20 | X |
| Injection flow rate (cc/s) | | 80 | | 80 | | 80 | |
| Mold temperature (° C.) | | 40 | | 40 | | 40 | |
| Injection temperature (° C.) | | 230 | | 230 | | 230 | |
| Results | | | | | | | |
| Gate marks | | None | Presence | — | — | — | — |
| G/F floating | | — | — | None | Presence | — | — |
| Silver streaks | | — | — | — | — | None | Many |

As shown in Table 4 and FIGS. 12 to 14, compared to the surface (marked as Naked surface) of an injection-molded product formed by a non-deposited mold surface (a mobile side plate), on the surface (a coating surface) of an injection-molded product formed by a mold surface (a fixed side plate) on which two PEEK resin deposition layers according to the present invention were formed, no gate marks and no silver streaks were generated, and no G/F floating occurred, indicating that appearance was excellent. Referring to FIGS. 12 to 14, in the images of the front sides (formed at a non-deposited (marked as Naked) surface of a mobile side plate) of injection-molded products manufactured by injection molding in Examples 11 to 13, the portions indicated by a dotted circle clearly showed that gate marks, G/F floating, and silver streaks were generated. In contrast, it was confirmed that the back side (formed at a deposited (coated) surface of a fixed side plate) of the product had no appearance defects such as gate marks.

TABLE 5

|  | | Example 14 | | Example 15 | |
| --- | --- | --- | --- | --- | --- |
| Classification | | Fixed side | Mobile side | Fixed side | Mobile side |
| Mold insulation coating | | Presence | Absence | Presence | Absence |
| First deposition layer | Component | PTFE | X | PTFE | X |
| | Thickness | 30 | X | 30 | X |
| Injection flow rate (cc/s) | | 80 | | 80 | |
| Mold temperature (° C.) | | 40 | | 40 | |
| Injection temperature (° C.) | | 230 | | 230 | |
| Results | | | | | |
| G/F floating | | None | Presence | None | Presence |

As shown in Table 5 and FIGS. 15 and 16, compared to the surface (marked as Naked) of an injection-molded product formed by a non-deposited mold surface (a mobile side plate), the surface (marked as Coated) of an injection-molded product formed by a mold surface (a fixed side plate) on which a single PTFE resin deposition layer according to the present invention was formed had no G/F floating, indicating that appearance was greatly improved.

TABLE 6

| Classification | | Example 16 | | Example 17 | | Example 18 | |
| --- | --- | --- | --- | --- | --- | --- | --- |
| | | Fixed side | Mobile side | Fixed side | Mobile side | Fixed side | Mobile side |
| Mold insulation coating | | Presence | Absence | Presence | Absence | Presence | Absence |
| First deposition layer | Component | PTFE | X | PTFE | X | PTFE | X |
| | Thickness | 30 | X | 30 | X | 30 | X |
| Injection flow rate (cc/s) | | 80 | | 80 | | 80 | |
| Mold temperature (° C.) | | 40 | | 40 | | 40 | |
| Injection temperature (° C.) | | 230 | | 230 | | 230 | |
| Results | | | | | | | |
| Appearance | | Good | bad | Good | G/F floating | Good | G/F floating |

(Evaluated as good when there were no gate marks, no G/F floating, and no silver streaks on the surface of an injection-molded product, and evaluated as poor when gate marks, G/F floating, or silver streaks were generated) As shown in Table 6 and FIGS. 17 to 19, compared to the surface (marked as Naked surface) of an injection-molded product formed by a non-deposited mold surface (a mobile side plate), on the surface (marked as Coated surface) of an injection-molded product formed by a mold surface (a fixed side plate) on which a single PTFE resin deposition layer according to the present invention was formed, no marks were generated and no G/F floating occurred, indicating that appearance was excellent.

Referring to FIG. 17, even when appearance was not good because an injection material contained a lot of additives as in Example 16, when a mold including a single PTFE resin deposition layer according to the present invention was used, appearance was greatly improved.

Referring to FIGS. 18 and 19, when the injection-molded product manufactured by foam injection molding in Example 17 and the injection-molded product manufactured by non-foam injection molding in Example 18 were manufactured using a mold on which a single PTFE resin deposition layer according to the present invention was formed, on the surfaces (marked as Coated surface) of the injection-molded products, no marks were generated, and no G/F floating occurred, indicating that appearance was excellent.

The invention claimed is:

1. An injection mold, comprising:
   a mold having a mold surface on which a deposition layer is formed, the deposition layer comprising two or more deposition layers,
   wherein a first deposition layer is provided on the mold surface and comprises polytetrafluoroethylene, and a second deposition layer is provided on the first deposition layer and comprises perfluoroalkoxy,
   wherein the first deposition layer has a thickness of 10 to 40 µm and wherein the second deposition layer has a thickness of 40 to 70 µm, a total thickness of the deposition layers is 50 to 80 µm, and
   wherein the two or more deposition layers are sinter-hardened deposition layers.

2. The injection mold according to claim 1, wherein the injection mold is a foam injection mold.

3. The injection mold according to claim 1, wherein the total thickness of the deposition layers is 50 to 70 µm.

4. The injection mold according to claim 1, wherein the mold surface comprises a mold surface of a fixed side plate, a mold surface of a mobile side plate, or both.

5. The injection mold according to claim 1, wherein the mold is configured to receive a molten resin therein, and the second deposition layer is configured and disposed to contact the molten resin within the mold.

6. The injection mold according to claim 1, wherein the deposition layer consists of the first deposition layer and the second deposition layer.

7. A method of manufacturing an injection-molded product, the method comprising:
   injection-molding a resin composition at an injection flow rate of 40 cc/s or more using and injection molding machine, the injection molding machine comprising:
   an injection mold, an injection apparatus, and an actuator,
   wherein the injection mold comprises:
      a mold having a mold surface on which two or more deposition layers are formed,
      wherein a first deposition layer is provided on the mold surface and comprises polytetrafluoroethylene, and a second deposition layer is provided on the first deposition layer and comprises perfluoroalkoxy,
      wherein the first deposition layer has a thickness of 10 to 40 µm and wherein the second deposition layer has a thickness of 40 to 70 µm, a total thickness of the deposition layers is 50 to 80 µm, and
      wherein the two or more deposition layers are sinter-hardened deposition layers.

8. The method according to claim 7, wherein the injection molding is foam molding performed by a short shot molding method or a core-back molding method.

* * * * *